(12) United States Patent
Wolfson et al.

(10) Patent No.: US 10,929,203 B2
(45) Date of Patent: Feb. 23, 2021

(54) COMPARE AND SWAP FUNCTIONALITY FOR KEY-VALUE AND OBJECT STORES

(71) Applicant: EMC IP Holding Company LLC, Hopkinton, MA (US)

(72) Inventors: Kfir Wolfson, Beer Sheva (IL); Udi Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/248,989

(22) Filed: Jan. 16, 2019

(65) Prior Publication Data

US 2020/0226000 A1 Jul. 16, 2020

(51) Int. Cl.
| | |
|---|---|
| *G06F 9/46* | (2006.01) |
| *G06F 9/54* | (2006.01) |
| *G06F 9/52* | (2006.01) |
| *G06F 16/22* | (2019.01) |
| *G06F 16/23* | (2019.01) |
| *G06F 12/1018* | (2016.01) |

(52) U.S. Cl.
CPC .................. *G06F 9/54* (2013.01); *G06F 9/52* (2013.01); *G06F 16/22* (2019.01); *G06F 16/2365* (2019.01); *G06F 12/1018* (2013.01); *G06F 2201/00* (2013.01); *G06F 2205/00* (2013.01); *G06F 2209/52* (2013.01)

(58) Field of Classification Search
CPC .. G06F 12/0246; G06F 12/0269; G06F 16/27; G06F 16/22; G06F 9/48; G06F 9/546; G06F 9/526; G06F 16/2255; G06F 12/1018; G06F 16/2365; G06F 2205/00; G06F 2201/00; G06F 2209/52; G06F 2209/521; G06F 9/54
See application file for complete search history.

(56) References Cited

U.S. PATENT DOCUMENTS

| | | | |
|---|---|---|---|
| 10,282,307 B1* | 5/2019 | Escriva | G06F 16/2255 |
| 10,535,368 B1* | 1/2020 | Dice | G11C 16/22 |
| 2007/0233970 A1* | 10/2007 | Saha | G06F 9/526 |
| | | | 711/152 |
| 2010/0179971 A1* | 7/2010 | Petrank | G06F 12/0269 |
| | | | 707/818 |
| 2011/0072241 A1* | 3/2011 | Chen | G06F 9/546 |
| | | | 712/202 |
| 2013/0275656 A1* | 10/2013 | Talagala | G06F 12/0246 |
| | | | 711/103 |
| 2014/0172790 A1* | 6/2014 | Pathak | G06F 16/27 |
| | | | 707/613 |
| 2017/0285981 A1* | 10/2017 | DeArment | G06F 9/48 |

* cited by examiner

*Primary Examiner* — Tuan A Vu
(74) *Attorney, Agent, or Firm* — Staniford Tomita LLP (57) ABSTRACT

Embodiments for providing compare and swap (CAS) functionality to key value storage to allow multi-threaded applications to share storage devices and synchronize multiple concurrent threads or processes. A key-value application programming interface (API) is modified to include a CAS API in addition to the standard Put and Get APIs. The CAS function uses a key, expected old value, and new value to compare and swap an existing key value only if its current value equals the expected old value. Hash values of the key value and expected old value may be used by the CAS function to improve performance and reduce bandwidth.

19 Claims, 4 Drawing Sheets

COMPARE AND SWAP FUNCTIONALITY FOR KEY-VALUE AND OBJECT STORES

TECHNICAL FIELD

Embodiments are generally directed to large-scale data storage systems and more specifically, to using compare and swap functionality with key value stores for multi-threaded application synchronization.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

A key-value database is a non-relational database in which data is stored as a collection of key-value pairs where the key serves as a unique identifier. The keys and values can be virtually any type of data from simple data objects to complex compound objects. They are highly partitionable and scaleable. Key-value stores are used in significant numbers of new applications and key-value stores can be created over block storage devices. There are also implementations of block devices over key-value storage. In a block storage device, data is organized as blocks to emulate traditional disk or ape storage. Blocks are identified by an arbitrary and assigned identifier by which they may be stored and retrieved. Since an identifier has no direct meaning in terms of files or documents, a file system (FS) is applied on top of the block-level storage to map files onto a sequence of blocks. Continued development in key-value storage technology may lead to databases that support key value operation with hundreds of nanosecond latency and millions of IOPS, which is similar IOPS/latency performance to primary NVME storage devices. Ultrafast key-value stores will thus be viewed as possible alternatives to legacy physical and virtual block-based storage systems.

Distributed applications often use compare and swap (CAS) functionality to achieve synchronicity between the applications. For example, multithreaded programs take advantage of the CPU instructions for test-and-set (e.g., TSL command) and atomic increment (e.g. LOCK XADD) to avoid threads stepping over each other. A compare and swap process basically compares an expected value to the concrete value of a variable, and if the concrete value of the variable equals the expected value, swaps the value of the variable for a new variable.

There are certain drawbacks in present CAS implementations, however. For example, distributed applications built on top of a shared key-value store do not have an inherent locking mechanism. Locks need to be implemented externally, to synchronize between independent agents writing to the shared object store. Ultrafast key-value-based storage also lack synchronization methods. Agents accessing the data must implement synchronization when writing to the same location. In addition, modern applications using a key-value store often have an eventually-consistent data model. Agents do not update the same item concurrently, and if they do, any one of the outcomes is considered "consistent." While this condition may work for certain applications, it is generally not acceptable for critical use-cases, such as in financial and medical databases, and the like. It is also not relevant when using the key-value stores as a block storage alternative, such as by legacy applications that still exist today and need solutions for running in modern environments.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. ECS is a trademark of DellEMC corporation, vSphere is a trademark of VMware Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data storage and processing techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
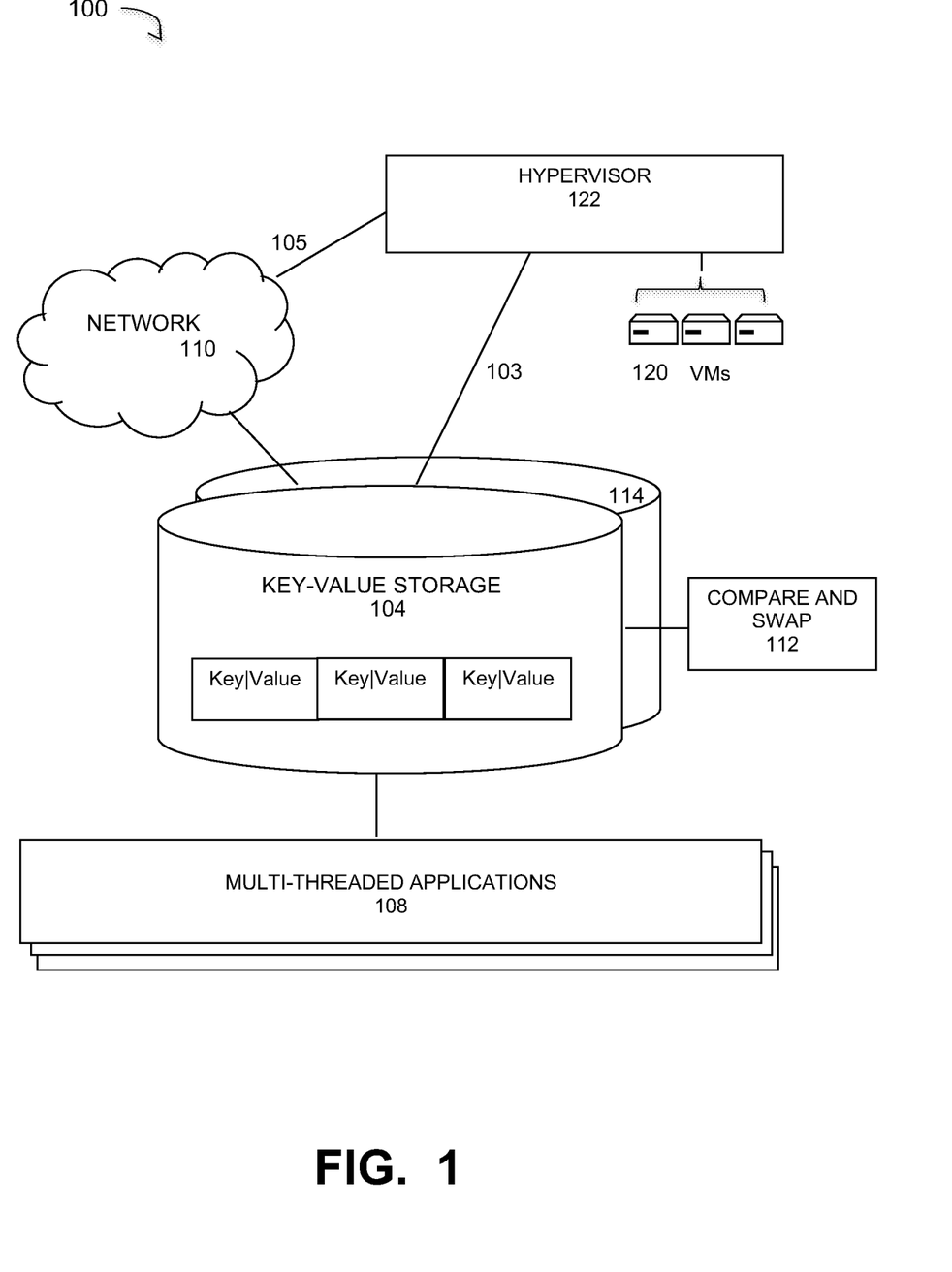
FIG. 1 is a diagram of a large-scale network implementing compare and swap functionality on key-value storage, under some embodiments.

Embodiments are directed to incorporating Compare and Swap (CAS) functionality to ultrafast key-value stores, thus allowing modern multithreading applications to share storage resources (devices) built on top of it. FIG. 1 is a diagram of a large-scale network implementing compare and swap functionality on key-value storage, under some embodiments.

As shown in FIG. 1, a server computer 122 is coupled to primary and secondary storage devices, including key-value storage 104 that contains one or more key-value databases. The connection may be direct 103 or indirect 105 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts.

For the embodiment of FIG. 1, key-value storage 104 may be a single unitary storage device (e.g., disk or flash memory) or it may include or be associated with a number of similar storage devices 104 and 114 to form a key-value storage array. A CAS component 112 is added to the key value storage to allow one more multi-threaded applications 108 to share the key-value storage 104. Applications 108 may represent any type or number of multi-threaded or multi-session that have multiple processes, functions, routines or other executables that require some degree of synchronicity to ensure proper performance.

In an embodiment, network 100 includes certain virtualization technology to implement virtual machines (VMs) 120 to provide virtualized resources within the system. As is known, virtual machine environments utilize hypervisors 122 to create and run the virtual machines. A computer running the hypervisor is a host machine and all virtual machines are guest machines running guest operating systems (OS). The hypervisor provides the guest OSs with a virtual operating platform and manages the execution of the VMs. In an embodiment, hypervisor 122 is a VM server that implements isolation of virtual machines 120 in terms of partition, which is a logical unit of isolation in which each guest operating system executes. A hypervisor stance has to have at least one parent partition. The virtualization stack runs in the parent partition and has direct access to the hardware devices. The parent partition then creates the child partitions which host the guest OSs. A parent partition creates child partitions using an API. In an embodiment hypervisor 122 may be a vSphere™ hypervisor from VMware®, which is a bare-metal hypervisor that virtualizes servers so that applications can be consolidated on less hardware. Any other similar or appropriate hypervisor may be also be used.

FIG. 1 illustrates just one example of a networked environment that implements CAS functionality on key-value stores, and many other network configurations are also possible. For example, any number of other physical and virtualized resources, such as server computers, clients, storage devices, interfaces, and so on may also be provided. The data generated or sourced by system 100 may be stored in any number of persistent storage locations and devices, such as local client storage, server storage, or network storage, which may at least be partially implemented through storage device arrays, such as RAID (redundant array of independent disks) components. In an embodiment network 100 may be implemented to provide support for various storage architectures such as storage area network (SAN), network-attached storage (NAS), or direct-attached storage (DAS) that make use of large-scale network accessible storage devices, such as large capacity disk (optical or magnetic) arrays.

Compare and Swap for Key-Value Storage

As shown in FIG. 1, a CAS process 112 is used by the key-value storage. Compare-and-swap (CAS) is an atomic instruction used in multithreading to achieve synchronization. It compares the contents of a memory location with a given value and, only if they are the same, modifies the contents of that memory location to a new given value. This is done as a single atomic operation and this atomicity guarantees that the new value is calculated based on up-to-date information. If the value had been updated by another thread in the meantime, the write would fail. The result of the operation must indicate whether it performed the substitution. A process built around CAS typically reads some key memory location and remembers the old value. Based on that old value, it computes some new value and then tries to swap in the new value using CAS, where the comparison checks for the location still being equal to the old value. If CAS indicates that the attempt has failed, it has to be repeated from the beginning, that is, the location is re-read, a new value is re-computed and the CAS operation is tried again. As described above, distributed applications often use CAS functionality at different levels.

Multi-threaded applications require certain processes, such as test-and-set routines and incrementors to maintain synchronicity among the threads, processes, functions, and so on. Such processes are considered to be executed simultaneously, near-simultaneously, or concurrently enough that if allowed to run together, they would overlap and interfere with one another. A test-and-set instruction is an instruction that generally writes 1 (set) to a memory location and returns its old value as a single atomic (i.e., non-interruptible) operation. If multiple processes may access the same memory location, and if a process is currently performing a test-and-set, no other process may begin another test-and-set until the first process test-and-set is finished.

Multi-threaded programs, such as may be included in applications 108, take advantage of the CPU instructions for test-and-set (e.g., TSL command) and atomic increment (e.g., LOCK XADD) to avoid threads interfering with each other. In another example, VMware vSphere Storage APIs Array Integration (VAAI) component defines a SCSI command called Atomic Test and Set (ATS) to implement CAS at the SCSI layer. In one implementation of the SCSI standard, a "COMPARE AND WRITE" command was inserted. The VMware ESXi software use the ATS SCSI-command to manage concurrent access from multiple hypervisors to the same VMFS datastore.

Embodiments are directed to adding new levels for CAS functionality 112 in key-value storages 104 and object stores. Object storage is a computer data storage architecture that manages data as objects, as opposed to other storage architectures like file systems that manage data as a file hierarchy, and block storage which manages data as blocks within sectors and tracks. Each object typically includes the data itself, a variable amount of metadata, and a globally unique identifier. Examples of popular object storage products include DellEMC® ECS™ (Elastic Cloud Storage), Amazon S3, Azure Storage, and others.

Figure 2:
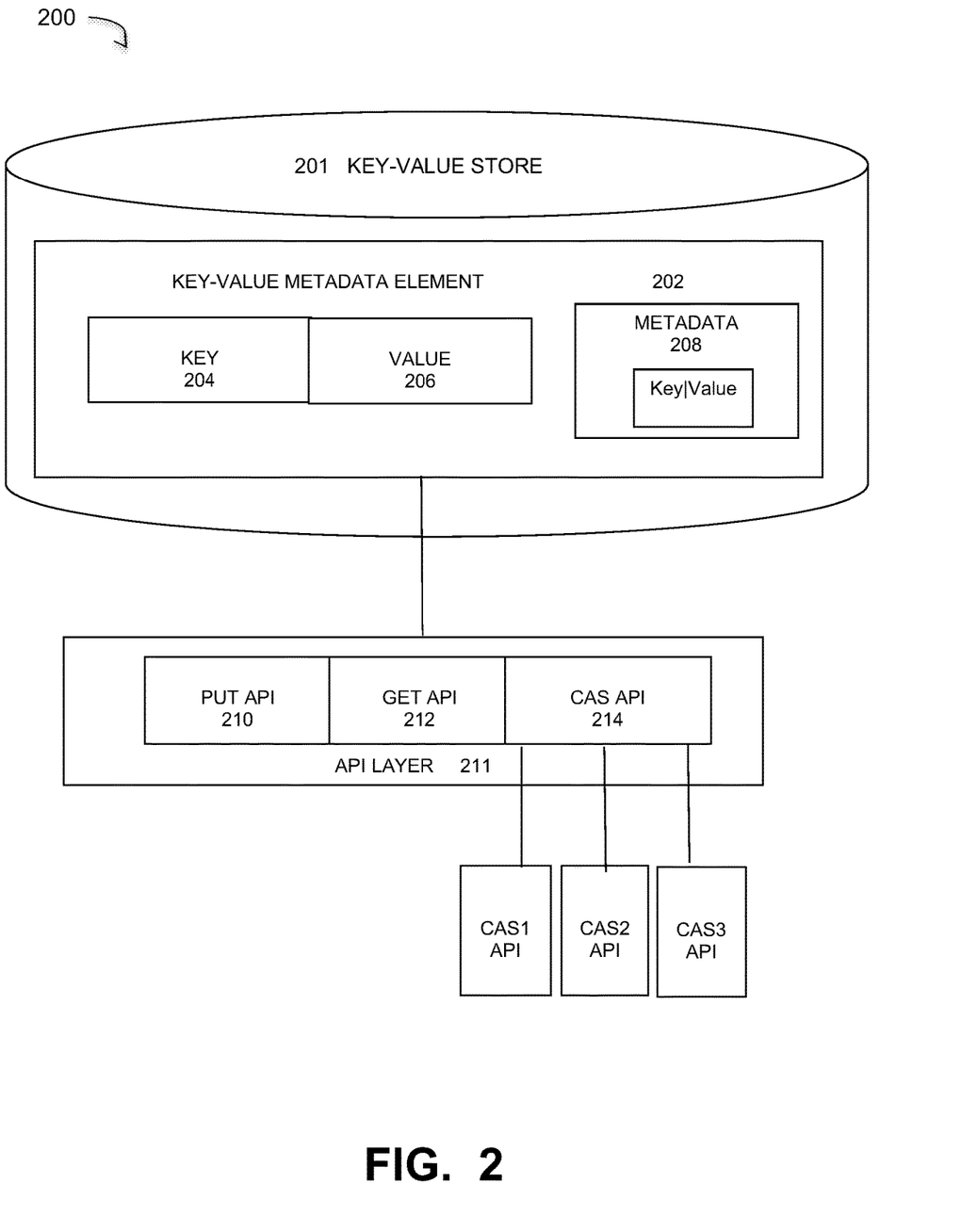
FIG. 2 illustrates an example layout for a key-value metadata element used in a CAS-based key-value store, under some embodiments

A standard key-value store API (application program interface) has two main functions:
 1. Put (key, value)
 2. Get (key)
  ⇒ returns value In some cases, a namespace parameter is added (in some places called a table). The namespace is globally unique and keys are unique within the namespace. Some implementations support additional optional metadata saved for each key-value pair. FIG. 2 illustrates an example layout for a key-value metadata element used in a CAS-based key-value store, under some embodiments. As shown in diagram 200 of FIG. 2, key-value store 201 stores a number of data elements 202 that each comprise a key 204, corresponding value 206, and metadata 208. The metadata itself is a key-value map of small size (e.g., several KB). Metadata is common in object stores, and such metadata may be any data that describes, quantifies, or otherwise represents some other actual data.

In an embodiment, a third main API is added to the above API.
 3. CompareAndSwap (key, expectedOldValue, newValue)
  ⇒ returns either "Success" or "Miscompare".

If the previous value for key is different than the expectedOldValue parameter, the call will fail with a failure reason of "Miscompare." Otherwise, the value is replaced with newValue and "Success" is returned.

In an embodiment the three different APIs are used to access the key value elements 202 in the key value store. As shown in FIG. 2, each API: Put 210, Get 212, and CAS 214 are provided in an API layer 211 that interfaces the data elements 202 in key-value store 201 to different versions of a CAS process that differ in terms of complexity. As also shown in FIG. 2, the CAS processes are denoted CAS1, CAS2, and CAS3, and are described in greater detail below.

In an example embodiment of the compare and swap process 112, a first implementation denoted "CompareAndSwap1" (CAS1), replaces the existing value if and only if its current value equals the expectedOldValue parameter. It uses a write-lock on the key to obtain atomicity of operations. A concurrent Set( ) command or another CompareAndSwap1 command for the same key will wait until the write-lock for this key is released.

Example pseudo-code for CompareAndSwap1 is provided as follows:

```
CompareAndSwap1 (key, expectedOldValue, newValue)
 1. Write-lock(key)
 2. If Get(key) != expectedOldValue
    2.1. returnValue := MISCOMPARE
 3. Else
    3.1. Put(key, newValue)
    3.2. returnValue := SUCCESS
 4. Release-Write-lock(key)
 5. return returnValue
```

The write-lock mechanism is provided as one way to ensure atomicity of the CAS operations, and other similar methods can also be used.

For large values, such as on the scale of megabytes, an improved process, denoted "CompareAndSwap2" (CAS2) can be used. This process compares the hash of the value to avoid getting and comparing the whole value every time. This hash is saved alongside the key-value pair in another key or in the metadata for the original key. The hash function should avoid collisions as much as possible, and for this embodiment, a fingerprint hash or cryptographic hash can be used. In this embodiment, a minor storage-size penalty may be incurred, but this is generally negligible if used only for large values.

Example pseudo-code for CompareAndSwap2 is provided below. In the code example, it is assumed that the Put( ) command saves the metadata and an internal function GetHash( ) exists which obtains it. The code below performs hash check for all values, but it can be changed to do it only above a certain threshold (e.g., expectedOldValue size>10 MB). It currently checks both hash (step 3) and value itself (step 6), but step 6 is optional. It can be removed if false-positives are permitted or hash function output is large enough to deem collision highly improbable (e.g., 128 bit).

```
CompareAndSwap2 (key, expectedOldValue, newValue)
 1. expectedOldHash := CalculateHash(expectedOldValue)
 2. Write-lock(key)
 3. If GetHash(key) != expectedOldHash
    3.1. returnValue := MISCOMPARE
 6. Else If Get(key) != expectedOldValue
    6.1. returnValue := MISCOMPARE
 7. Else
    7.1. Put(key, newValue)
    7.2. returnValue := SUCCESS
 4. Release-Write-lock(key)
 5. return returnValue
```

For improved performance and bandwidth, a CompareAndSwap 3 (CAS3) process is used. In this embodiment, the implementation of CompareAndSwap2 is altered by changing the API to accept the expected old hash instead of the old value. This can substantially save bandwidth for keys with large values, as it only sends one large parameter, i.e., the newValue.

Example pseudo-code for CompareAndSwap3 is provided below.

```
CompareAndSwap3 (key, expectedOldHash, newValue)
6. Write-lock(key)
7. If GetHash(key) != expectedOldHash
   7.1. returnValue := MISCOMPARE
8. Else
   8.1. Put(key, newValue)
   8.2. returnValue := SUCCESS
8. Release-Write-lock(key)
9. return returnValue
```

The three CompareAndSwap CAS1, CAS2, and CAS3 routines can co-exist in combination and be used as needed or desired. For this embodiment, the system can be configured so that the user can call the most appropriate API, according to their needs. In an embodiment, certain parameters such as hash function, hash size, value size threshold are used by the APIs and functions. These can either be set to system default values, or they can be set by the user per namespace/database instance, according to the application needs.

Figure 3:
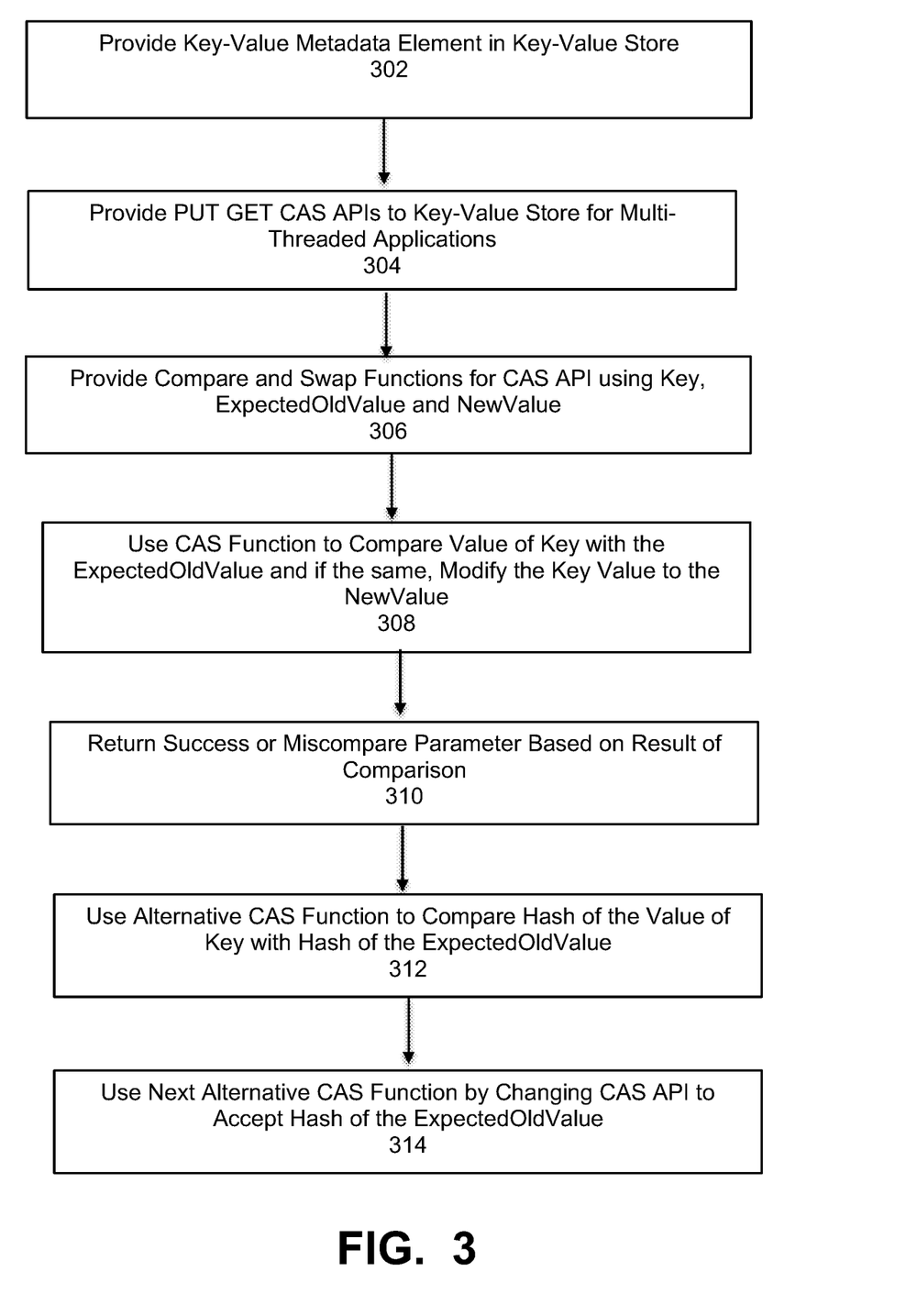
FIG. 3 is a flowchart illustrating a method of providing compare and swap functions for key-value stores, under some embodiments.

FIG. 3 is a flowchart that illustrates a method of providing compare and swap functionality, under some embodiments. As shown in FIG. 3, the overall process starts by providing key-value metadata elements in a key-value store to be accessed 302, such as by one or more multi-thread applications having concurrent processes that require synchronization. APIs for PUT/GET/CAS functions are provided for these applications, 304. The compare and swap functions use the key, expected old value and new value parameters, 306. A current value of the key is compared with the expected old value. If they are the same, the value is replaced (swapped) with the new value, and a success parameter is returned, 308. Otherwise a miscompare parameter is returned, 310. Modifications of the CAS function include comparing a hash of the key value with a hash of the expected old value 312, and changing the CAS API to accept the hash of the expected old value, 314.

Embodiments of the method illustrated in FIG. 3 thus provide compare and swap (CAS) functionality to key value storage to allow multi-threaded applications to share storage devices and synchronize multiple concurrent threads or processes. A key-value application programming interface (API) is modified to include a CAS API in addition to the standard Put and Get APIs. The CAS function uses a key, expected old value, and new value to compare and swap an existing key value only if its current value equals the expected old value. Hash values of the key value and expected old value may be used by the CAS function to improve performance and reduce bandwidth.

Use Cases

Modern applications perform operations from distributed entities concurrently. Scaled-out applications, such as in microservices architectures, have multiple similar instances updating one or more backend shared storage entities. An example use-case for CAS support 112 on key-value store 104 is a concurrent counter. For example, in a large audience voting competition, one implementation of it could be a vote handler service that receives the incoming Text Message (SMS), parses it to understand which competitor the sender voted for (e.g. "competitor #7") and increase the voting count for that competitor. For this implementation, the counters are saved in a key-value store. Each key is the competitor identifier (ID), and the value is the current voting count (integer) for that competitor. Since the audience count can reach the millions and the voting period is limited, all or most voters can vote at the same time. A scaled-out application approach can thus be taken, creating multiple instances of the vote handler service.

If the implementation of the vote handler counter increment used a known basic approach, an example code structure would be:
1. counter=Get (competitorID)
2. Put (competitorID, counter+1)

In this case, there would be a problem with concurrent access to the same competitor, which will have to be handled by an external locking mechanism to slow down all the vote handler instances. A better implementation would be to use CompareAndSwap:
1. counter=Get (competitorID)
2. result=CompareAndSwap1 (competitorID, counter, counter+1)
3. If result==MISCOMPARE, go to step 1.

Other improvements can also be performed, like adding an atomic increment function to the key-value store or using map-reduce methods. The example above shows how concurrency can be handled relatively simply once the persistency layer supports CAS functionality.

Another example is an inter-hypervisor synchronization example. An example use-case for CAS functionality can be found in VMware Hypervisor synchronization algorithms, in the form of SCSI Atomic Test and Set (ATS) command. For an example VMware VAAI case, in VMware vSphere VMFS, many operations must establish a lock on the volume when updating a resource. Because VMFS is a clustered file system, many ESXi hosts can share the volume. When one host must make an update to the VMFS metadata, a locking mechanism is required to maintain file system integrity and prevent another host from coming in and updating the same metadata. The following operations require this lock:
1. Acquire on-disk locks
2. Upgrade an optimistic lock to an exclusive/physical lock
3. Unlock a read-only/multi-writer lock
4. Acquire a heartbeat
5. Clear a heartbeat
6. Replay a heartbeat
7. Reclaim a heartbeat
8. Acquire on-disk lock with dead owner Thus, it should be understood that various VMFS metadata operations require a lock. ATS is an enhanced locking mechanism designed to replace the use of SCSI reservations on VMFS volumes when doing metadata updates. A SCSI reservation locks a whole LUN and prevents other hosts from doing metadata updates of a VMFS volume when one host sharing the volume has a lock. This can lead to various contention issues when many virtual machines are using the same datastore. It is a limiting factor for scaling to very large VMFS volumes. ATS is a lock mechanism that must modify only a disk sector on the VMFS volume. When successful, it enables an ESXi host to perform a metadata update on the volume. This includes allocating space during provisioning, because certain characteristics must be updated in the metadata to reflect the new size of the file.

With respect to implementing block device storage with CAS/ATS over key-value store, an example implementation of block storage READ, WRITE and ATS (CAS) operations over a suggested key-value store is provided. For simplicity, the example implementation below is limited to operations at a single block resolution. The block size can be a parameter, for example 1 block=512 bytes. So "data" parameters below are 1 block size.

```
READ (volumeID, offset):
  1. key := volumeID, offset
  2. return Get(key)
WRITE (volumeID, data, offset):
  1. key := volumeID, offset
  2. Put(key, data)
  3. return SUCCESS
ATS (offset, oldData, newData):
  1. key := volumeID, offset
  2. return CompareAndSwap1(key, oldData, newData)
```

This simple example may not hold up to performance requirements of a real enterprise-grade storage implementation, but it is provided as an example of how CAS functionality in the form of SCSI ATS can be achieved over a CAS-supporting key-value store, as shown in FIG. 1. Higher-performing implementations will naturally support large input/output (IO) operations, and embodiments can be expanded to handle these implementations.

As modern applications use object stores and key-value storages today, added functionality to these backend services could improve multi-threaded, multi-process, and multi-service application implementations. With the expected improvements in key-value storages performance (i.e., bringing them up to storage-array speeds), the added functionality of providing CAS functionality is advantageous.

Certain above code segments and naming conventions, and any others shown herein are provided for the sake of illustration only, and do not limit any embodiments or implementations. Many alternative languages, data elements, and code structures as known to those of skill in the art may be used to achieve the same functionality.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 4:
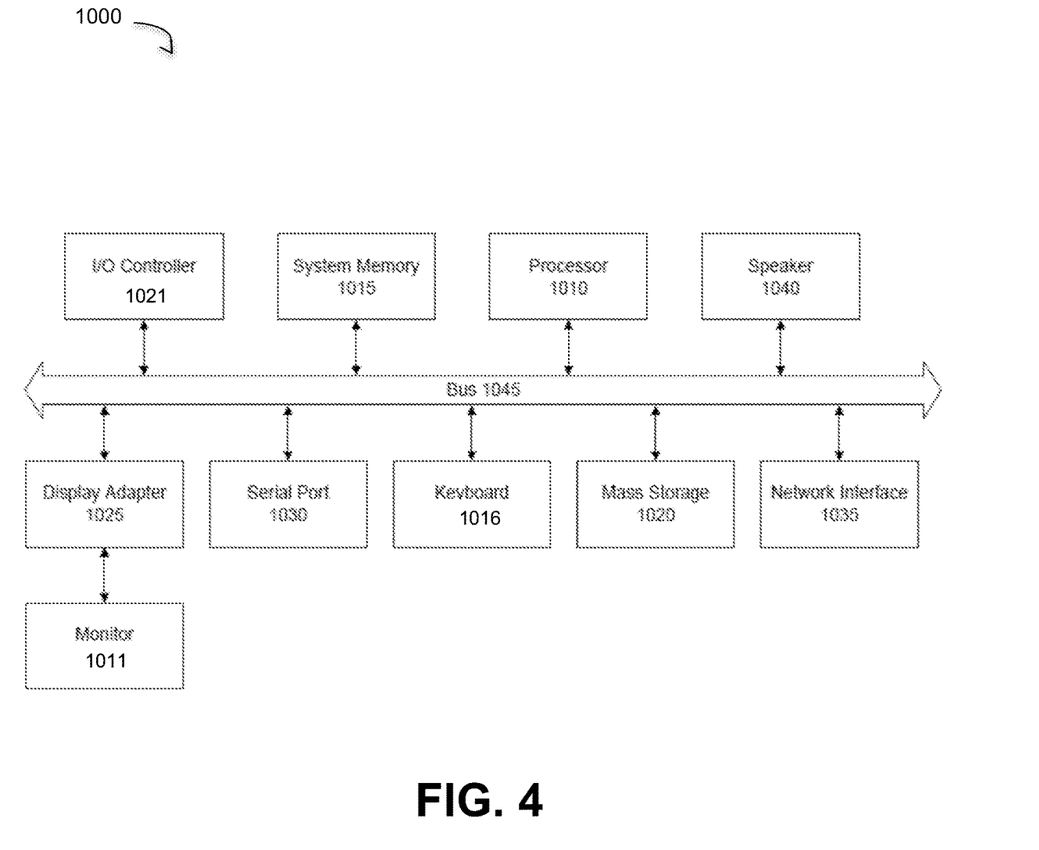
FIG. 4 is a block diagram of a computer system used to execute one or more software components of a system using compare and swap functions for key-value stores, under some embodiments.

FIG. 4 is a block diagram of a computer system used to execute one or more software components of a system for providing compare and swap functionality to key-value stores, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of accessing a key-value storage using a compare and swap (CAS) process, comprising:
   providing a key-value metadata element comprising key, a corresponding value, and associated metadata;
   providing a PUT function to put data into the key and value;
   providing a GET function to get a value stored for the key;
   providing a CAS application program interface (API) to access a plurality of compare and swap (CAS) functions on the key for an expected old value and a new value, and return either a success or miscompare result, wherein the plurality of CAS functions comprise a first CAS function that compares the key with the expected old value, a second CAS function that compares the key with a hash of the expected old value, and a third CAS function wherein the CAS API accepts the hash of the expected old value as the key value pair for the compare;
   selecting a CAS function from the plurality of CAS functions based on hash function, hash sizes, and value size thresholds; and
   performing the selected CAS function on the key value element using the CAS API by a multi-threaded application comprising multiple processes that require synchronization to access data in the key-value storage.

2. The method of claim 1 wherein the selected CAS function:
   performs the compare; and
   modifies, if they are the same, the contents of the memory location to the new value, by replacing an existing value of the memory location for the key with the new value and returning a success parameter; and
   returns, if they are different, a miscompare parameter signifying a failed comparison.

3. The method of claim 2 further comprising:
   using a write-lock on the key to obtain atomicity of the multiple processes; and
   using a concurrent set command or another compare and swap function for the same key to wait until the write-lock for the key is released.

4. The method of claim 2 wherein the second CAS function compares a hash of the value of the key with a hash of the expected old value, wherein the hash of the value of the key is saved in one of: the key-value pair in another key or in the metadata of the key-value metadata element.

5. The method of claim 4 wherein the hash is generated by a hash function comprising one of: a fingerprint hash and a cryptographic hash.

6. The method of claim 4 wherein the third CAS function is selected to save bandwidth for keys with large values.

7. The method of claim 1 wherein the selected CAS function uses parameters for a selected hash function, hash size, and value size threshold, and wherein the parameters are set by a user based on requirements of the multi-threaded application.

8. A system comprising:
   a server computer;
   a key value storage device coupled to the server computer and storing a plurality of key-value databases;
   one or more multi-threaded application components coupled to the key value storage device, wherein a PUT function puts data into the key and value, and a GET function gets a value stored for the key; and
   a Compare and Swap (CAS) processing component associated with the key-value storage device to allow multi-threading application components to share the storage resources of the key value storage device, wherein the CAS processing component
      provides a CAS application program interface (API) to access a plurality of compare and swap (CAS) operations on the key for an expected old value and a new value, and return either a success or miscompare result, wherein the plurality of CAS operations comprise a first CAS operation that compares the key with the expected old value, a second CAS operation that compares the key with a hash of the expected old value, and a third CAS operation wherein the CAS API accepts the hash of the expected old value as the key value pair for the compare,
      selects a CAS operation from the plurality of CAS operations based on hash function, hash sizes, and value size thresholds, and
      performs the selected CAS operation on the key value element using the CAS API by a multi-threaded application comprising multiple processes that require synchronization to access data in the key-value storage.

9. The system of claim 8 wherein the multi-threaded application components execute at least one multi-threaded application comprising a plurality of program processes executed concurrently and that need synchronization to ensure proper operation.

10. The system of claim 9 wherein the multi-threaded application requires test-and-set routines and incrementors to maintain the synchronicity.

11. The system of claim 9 further comprising:
    a key-value metadata element comprising the key, a corresponding value, and associated metadata; and
    an application program interface (API) layer providing a PUT API, GET API, and the CAS API to perform the selected CAS operation on the key for an expected old value and a new value, and return either a success or miscompare result.

12. The system of claim 11 wherein the first CAS operation:
    compares an existing value of the key with the expected old value; and
    modifies, if they are the same, the contents of the memory location to the new value, by replacing an existing value of the memory location for the key with the new value and returning a success parameter; and
    returns, if they are different, a miscompare parameter signifying a failed comparison.

13. The system of claim 12 wherein, for the second CAS operation, the hash of the value of the key is saved in one of: the key-value pair in another key or in the metadata of the key-value metadata element, and wherein the hash is generated by a hash function comprising one of: a fingerprint hash and a cryptographic hash.

14. The system of claim 13 wherein the third CAS operation is selected to save bandwidth for keys with large values.

15. The system of claim 8 wherein the storage device comprises an object storage that manages data as objects, and wherein each object includes the data, an amount of metadata, and a globally unique identifier.

16. A computer-implemented method of accessing a key-value storage using a compare and swap (CAS) process, comprising:

reading a key memory location of the key-value storage;
remembering a previous value of the key memory location;
computing, based on the previous value, a new value;
selecting the selected CAS operation from a plurality of CAS operations based on hash function, hash sizes, and value size thresholds, wherein a first CAS operation compares the key with an expected old value, a second CAS operation that compares the key with a hash of the expected old value, and a third CAS operation wherein a CAS API accessing the plurality of CAS operations accepts the hash of the expected old value as the key value pair for the compare,
attempting to swap in the new value using a selected CAS function, where a comparison step of the selected CAS function checks for the key memory location still being equal to the previous value; and
repeating, if the selected CAS function indicates that the attempting step has failed, the reading and computing steps by re-reading the key memory location, re-computing a subsequent new value, and performing the selected CAS function for the subsequent new value.

17. The method of claim 16 further comprising:

compares an existing value of the key with an expected old value;
modifying, if they are the same, the contents of the memory location to the new value, by replacing an existing value of the memory location for the key with the new value and returning a success parameter; and
returning, if they are different, a miscompare parameter signifying a failed comparison.

18. The method of claim 17 wherein, for the second hash function, the hash of the value of the key is saved in one of: the key-value pair in another key or in the metadata of a key-value metadata element, and wherein the hash is generated by a hash function comprising one of: a fingerprint hash and a cryptographic hash.

19. The method of claim 18 wherein the third CAS operation is selected to save bandwidth for keys with large values.

* * * * *